United States Patent Office 3,384,151
Patented May 21, 1968

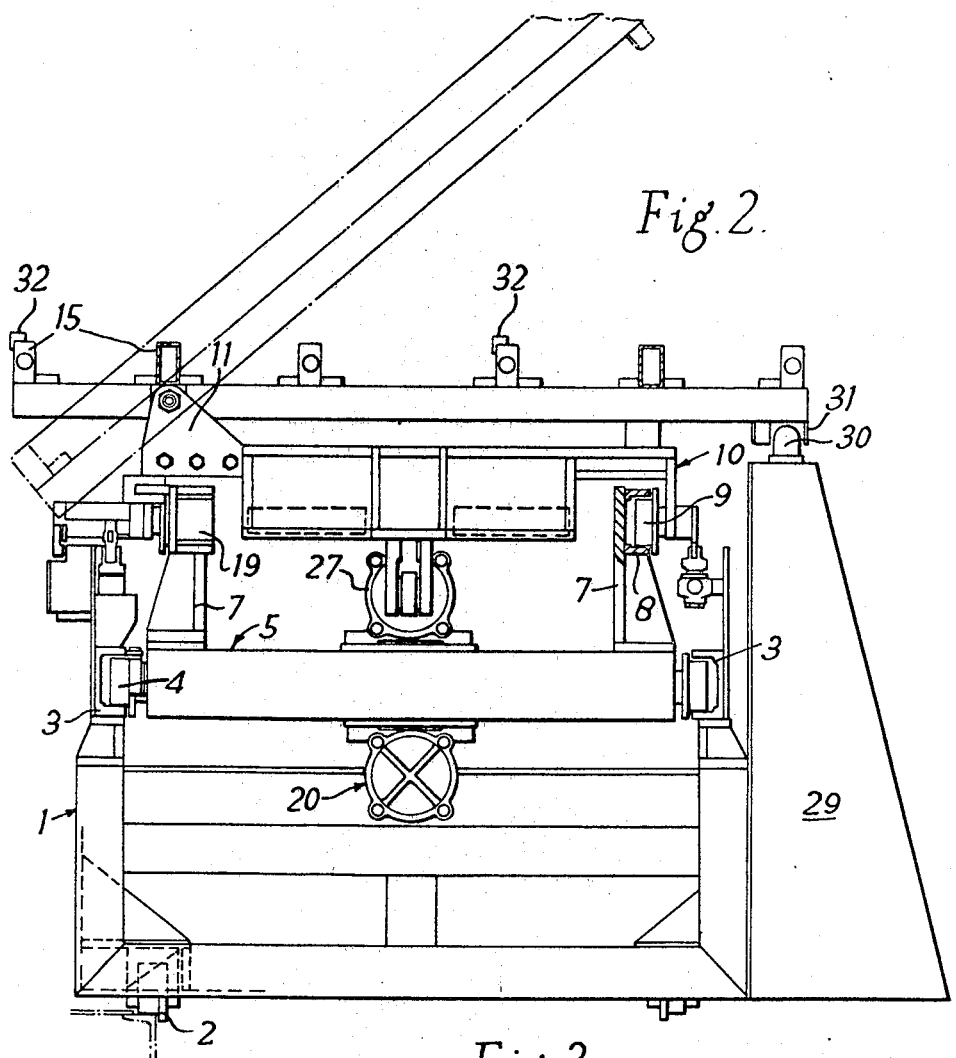
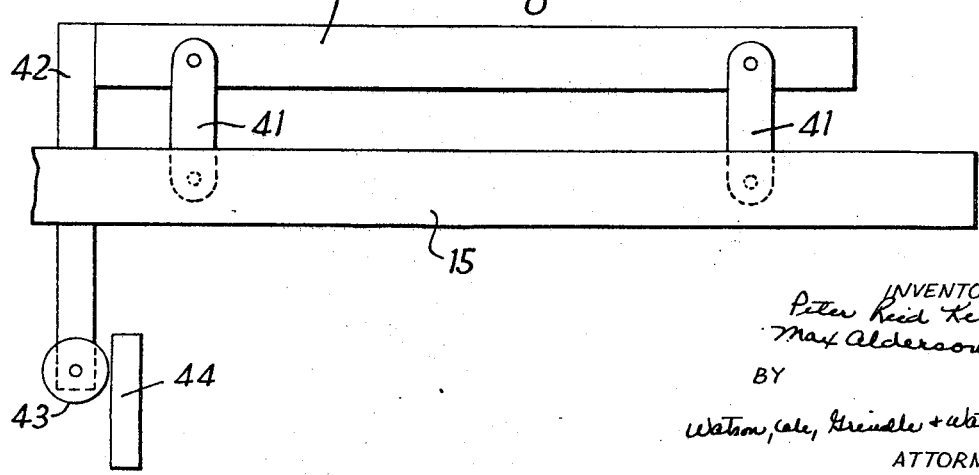

3,384,151
APPARATUS FOR REMOVING SHELL MOULDS FROM A SHELL MOULDING MACHINE
Peter Reid Kerr, Richmond, Surrey, and Max Alderson, Kings Newton, Derbyshire, England, assignors to Keramatic Engineering Company Limited, Kingston-upon-Thames, England, a British company
Filed Sept. 22, 1965, Ser. No. 489,172
Claims priority, application Great Britain, Sept. 22, 1964, 38,663/64
10 Claims. (Cl. 164—180)

ABSTRACT OF THE DISCLOSURE

Apparatus for removing resinated sand shell moulds from a shell moulding machine comprises a base frame supporting a first wheeled carriage movable along the frame, the first carriage supporting a second wheeled carriage movable along the first carriage and carrying a plurality of cantilevered and tiltable fingers; the carriages are movable along the frame to present the fingers below shells produced in the shell moulding machine and to remove the shells from the machine, whereupon tilting of the fingers presents the shells in a position in which they can be readily removed from the fingers.

---

Figure 1:
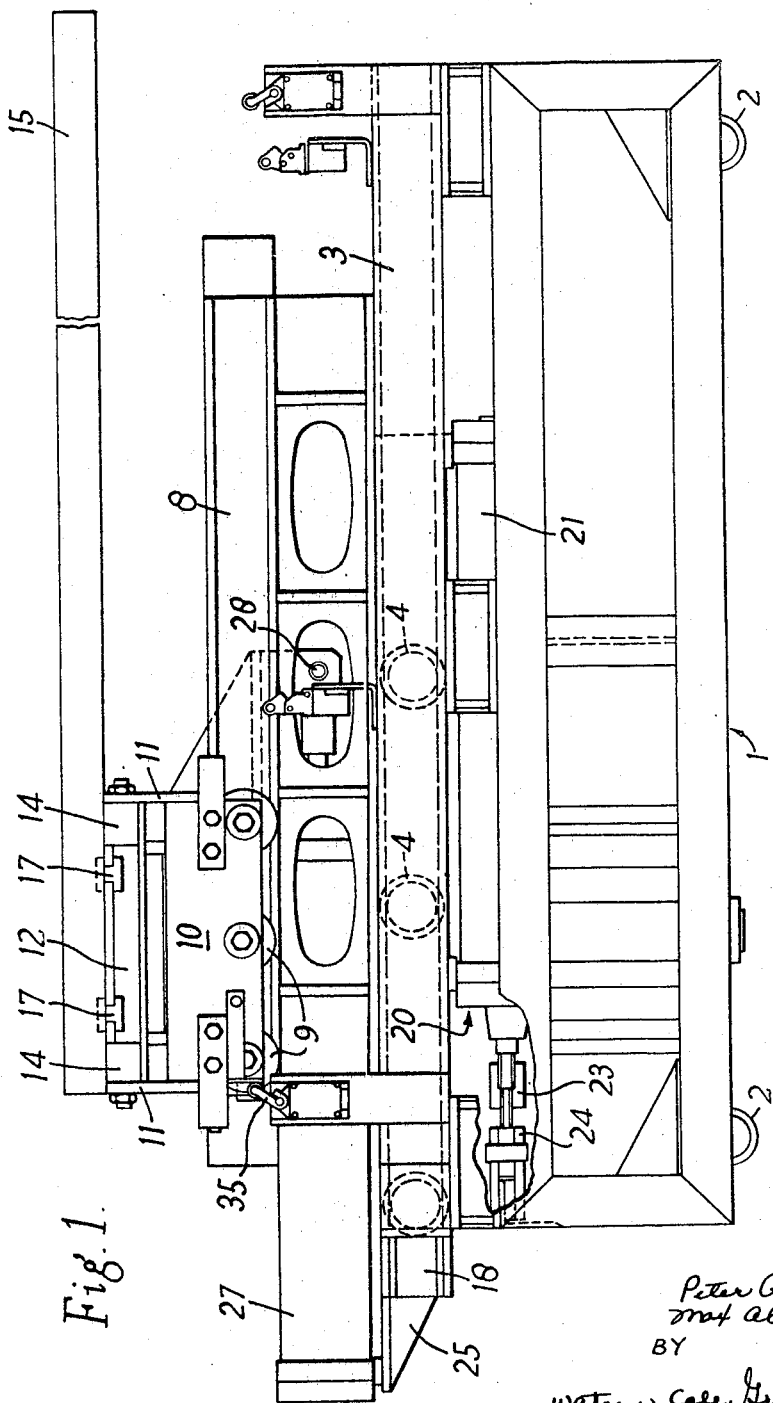

This invention relates to apparatus for removing resinated sand shell moulds from a shell moulding machine, and is particularly adapted for use with a shell moulding machine in which the shell is manufactured horizontally. However, the apparatus may be adapted for use with shell moulding machines which manufacture the shells in other positions.

According to the present invention there is provided apparatus for removing resinated sand shells from a shell moulding machine, comprising a movable carriage arrangement bearing a plurality of cantilevered fingers movable by the carriage arrangement into and out of a shell moulding machine, and means for tilting the fingers about an axis parallel to the fingers so as to present shells in a position from which they can readily be removed from the fingers.

After a shell moulding machine has manufactured a resinated sand shell, the shell may be raised from a pattern in the machine by stripper pins. The carriage arrangement of the present apparatus is then actuated to present the fingers between the stripper pins which are then lowered to deposit the shell on to the fingers. The fingers are then retracted from the machine by the carriage arrangement and are tilted about an axis parallel to the fingers to present the shells at an angle which is preferably about 45°, so that the shells may be readily removed from the fingers by the operators.

Alternatively, the fingers may have supplementary fingers attached thereto and ararnged, when the main fingers are presented between the stripper pins, to rise and lift the shell from the stripper pins. This alternative arrangement is particularly valuable when the space between the shell and the pattern is limited or when the pattern has depressions into which parts of the shell depend even when the shell has been raised by the stripper pins.

The carriage arrangement of the present invention is preferably a double carriage arrangement comprising lower carriage movable on a base and an upper carriage movable in the lower carriage, whereby a greater distance of travel for the fingers can be obtained for a smaller size of apparatus than when using only one carriage.

In order to enable the invention to be more readily understood, reference will now be made to the accompanying drawings which illustrate diagrammatically and by way of example two embodiments thereof, and in which:

FIG. 1 is a side view of apparatus for removing shells from a horizontal shell moulding machine, FIG. 2 is an end view, partly in section, of the apparatus shown in FIG. 1, and FIG. 3 is a fragmentary side view of a modification of the apparatus shown in FIGS. 1 and 2.

Referring now to FIGS. 1 and 2 of the drawings, the apparatus for removing the shells from a horizontal shell moulding machine there shown comprises a substantially parallelopiped base frame 1 formed from angle irons and mounted on wheels 2. Along each side of the base frame 1 is mounted a channel section rail 3, with the channels facing one another. Disposed within each channel are three flanged wheels 4 of a lower carriage 5 movable along the rails 3. The lower carriage 5 has a main frame, along each side of which are supports 7 carrying at their ends further rails 8 of channel section, with the channels facing outwards (FIG. 2 right hand side). Three flanged wheels 9 of a six-wheeled upper carriage 10 run in each of the further rails 8. At each end of the upper carriage 10 and at one side edge thereof is secured a bracket 11. A finger carrier 12, extending across the width of the apparatus, is fitted near one side with trunnions 14, and is pivotally mounted between the brackets 11. The finger carrier 12 carries six fingers 15 cantilevered on the finger carrier and extending for substantially the length, or slightly greater than the length of the base frame of the apparatus. The finger carrier 12 has slots within which the heads of T-nuts 17 are movable, the nuts being engaged by bolts which allow adjustment of the fingers, which as shown in FIG. 2 are of hollow rectangular tubular section.

The two end pairs of the flanged wheels 4 of the lower carriage 5 bear on the bottom of the channel-section base rails 3 mounted on the base frame, and the middle two flanged wheels run on the top of the rail thereby serving to stabilize the carriage. Likewise, the wheels 9 of the upper carriage 10 run in a similar manner, four bearing on the bottom of the upper rails 8 and two opposed wheels bearing on the top of the rails. Each wheel 4 or 9 is mounted on an eccentric spindle to facilitate wear correction and original setting up, and each wheel is fitted with fully sealed bearings.

Each carriage 5 or 10 is fitted with a roller (not shown) at each corner, the rollers bearing on the sides of the rails and serving to ensure accurate traverse of the carriage. The rails are provided with end stops 18 for lower rails 3 and 19 for upper rails 8 in order to limit the movements of the respective carriages.

Each carriage is movable between its associated end stops by means of a respective piston and cylinder arrangement.

A first piston and cylinder arrangement 20 for moving the lower carriage 5 is mounted centrally within the base frame 7, the cylinder 21 of the arrangement being slung underneath the carriage, and the piston rod of the piston and cylinder arrangement 20 being connected by clevises 23 and 24 to the end of the base frame.

At its rear end, the lower carriage 5 has a support bracket 25 above which is mounted a further cylinder 27 having a piston which is likewise connected by clevises (not shown) to the upper carriage at 28. Connections for the supply of pneumatic fluid under pressure to the cylinders, and exhaust connections from the cylinders, are provided, but are not shown for simplicity, since the arrangement and provision of such connections is well understood.

A generally vertically extending cylinder is mounted in a guard housing 29 (FIG. 2) on trunnions (not shown) near its upper end. The cylinder has a piston the end 30 of which engages with a guide 31 at the side of the finger carrier 12 remote from its pivot point, the vertical cylinder being operable to raise the finger carrier and thus the fingers so as to pivot the finger carrier and fingers about an axis parallel to the fingers whereby the finger carrier and fingers lie at an angle of about 45° to the horizontal as shown in broken lines in FIG. 2.

Stop blocks 32 are fitted to the fingers to prevent shells from moving on the fingers 15 when the fingers are tilted.

For facilitating automatic operation of the apparatus, it is desirably provided with a number of switches. These switches which include limit switches which may be solenoid valves or air valves are of well known kinds so that their construction need not be described in detail. Also their positioning on the apparatus will depend to some extent upon the type of switch employed. In the following description of the operation of the apparatus, the functions which these switches have to perform will be outlined, some of these switches being shown in the drawings.

In the operation of the apparatus just described in conjunction with a horizontal shell moulding machine (not shown), after the shell moulding machine has manufactured the shell, or more generally a pair of shells, the shells are raised from the pattern by stripper pins. When the latter have reached their full height they trip a limit switch on the shell moulding machine which sets the present aparatus into operation, causing the cylinders 21 and 27 to operate and move their respective carriages 5 and 10 together from the retracted position shown in FIG. 1 to a position where the fingers enter the shell moulding machine between the stripper pins. When the fingers 15 have been extended for the full length permitted by the travel of the upper and lower carriages, the upper carriage operates a limit switch which actuates the pin moving mechanism to lower the stripper pins, whereby the shells are deposited on the fingers. When the stripper pins reach their lowest position, they actuate a further limit switch which causes the carriages to be moved in the reverse direction, thereby retracting the fingers and the shells thereon from the shell moulding machine. When the carriages and the fingers have been fully retracted, the upper carriage operates a further limit switch 35 which sets in motion the tilt mechanism causing the vertically arranged cylinder to operate and raise the finger carrier 12 in the manner set forth above, whereby the shells, resting on the fingers are presented at an angle of about 45°, so that they can be readily lifted from the fingers by operators. After a predetermined time, the tilt mechanism is reversed and the cycle is repeated, further shells having been made in the shell moulding machine during the withdrawal and tilting of the fingers.

It is to be appreciated that many modifications of the present apparatus may be made, and the carriages may be mounted on V-groove wheels instead of flanged wheels. Furthermore, the hollow fingers may be adapted in such a way that it is possible to spray a release agent through the ends of the fingers on to the shell moulding patterns as the fingers enter between the stripper pins. Such spraying need not take place every traverse but, for example, may be arranged to take place on every twelfth traverse.

Referring now to FIG. 3, there is shown a modification in which each finger 15 has attached to it a supplementary finger 40, the supplementary finger being pivotally attached by two links 41. Depending from the rear end of the supplementary finger 40 is a bar 42 carrying at its end a roller 43 arranged to engage against a fixed plate 44 on the apparatus. With this modification, the supplementary fingers normally lie behind the fingers 15 with the links 41 horizontal. As the fingers 15 near the end of their travel into the shell moulding machine and beneath the stripper pins, the rollers 43 engage against the plates 44, whereby further movement of the fingers 15 causes the rollers to ride up the plates and the links 41 to pivot thereby raising the supplementary fingers into the position shown in FIG. 3. The supplementary fingers thus raise the shells from the stripper pins in contrast to the previous case where the pins retracted to deposit the shells on the fingers. This arrangement is particularly valuable where the space between the shell and the pattern is limited or when the pattern has depressions into which parts of the shell still depend when the shell has been raised by the stripper pins so that it is necessary to raise the shell still further before it can be withdrawn horizontally.

We claim:

1. For use with a shell moulding machine, apparatus for removing resinated sand shells produced in the machine, said apparatus comprising in combination a base frame, first rail members extending horizontally for substantially the length of said base frame, a first carriage, wheel means on said first carriage engaging with said rail members on the base frame, second rail members extending for substantially the length of said first carriage and parallel to said first rail members, a second carriage, wheel means on said second carriage engaging with said second rail members, a finger carrier mounted to one side of and extending across said second carriage so as to be tiltable about an axis extending parallel to said rail members, means for engaging said finger carrier to tilt the latter about said axis, a plurality of fingers cantilevered on said finger carrier and extending therefrom in a direction parallel to said rail members, and means for moving said first and second carriages along their respective rail members from a retracted position where the carriages lie at one end of the apparatus to an extended position where the fingers enter the shell moulding machine below the shells produced in said machine and remove said shells when the carriage is returned to their retracted position, whereupon operation of the tilting means presents the shells in a position from which they can readily be removed from the fingers.

2. The apparatus of claim 1, wherein said rail members are channel-section members, the webs of which lie substantially vertically, and wherein the wheel means of each of said carriages comprise flanged wheels movable in said channel section rail members.

3. The apparatus of claim 2, wherein the channels of one set of rail members are opposed and the channels of the other set of rail members face one another.

4. The apparatus of claim 2, wherein each carriage has at least six wheels of which four bear on the lower edges of the guide rails while two opposed wheels bear on the upper edges of the guide rails.

5. The apparatus of claim 4, wherein each wheel is mounted on an eccentric spindle to facilitate wear correction and setting up.

6. The apparatus of claim 1, wherein said means for moving said first and second carriages comprises two pneumatic pistons and cylinder arrangements each mounted to move a respective carriage.

7. The apparatus of claim 1, wherein said tilting means comprises a substantially vertically mounted pneumatic piston and cylinder arrangement arranged to engage said finger carrier at a location remote from its tilting axis.

8. The apparatus of claim 1, wherein the fingers are of hollow tubular section.

9. The apparatus of claim 1, wherein stop blocks are fitted to the fingers to prevent shells from moving on the fingers when the fingers are tilted.

10. The apparatus of claim 1, wherein supplementary fingers are linked to the main fingers, and wherein means are provided for raising the supplementary fingers above the main fingers as the latter near the end of their travel into the shell moulding machine, the linkage being such that the supplementary fingers always lie parallel to the main fingers as they are raised.

References Cited

UNITED STATES PATENTS

| 3,019,054 | 1/1962 | Stahly | 298—18 |
| 3,277,521 | 10/1966 | Strauss | 18—2 |
| 3,277,522 | 10/1966 | Strauss | 18—2 |

FOREIGN PATENTS 127,182  10/1960  U.S.S.R.

J. SPENCER OVERHOLSER, *Primary Examiner.*

R. D. BALDWIN, *Examiner.*